US011600074B2

(12) United States Patent
Sherman et al.

(10) Patent No.: US 11,600,074 B2
(45) Date of Patent: Mar. 7, 2023

(54) OBJECT RE-IDENTIFICATION

(71) Applicant: Anno.ai, Inc., Minnetonka, MN (US)

(72) Inventors: Joseph Sherman, Minnetonka, MN (US); Michael Mohamed, Minnetonka, MN (US); Andrew Hayes, Minnetonka, MN (US)

(73) Assignee: Anno.ai, Inc., Minnetonka (MN)

( * ) Notice: Subject to any disclaimer, the term of this patent is extended or adjusted under 35 U.S.C. 154(b) by 0 days.

(21) Appl. No.: 17/696,285

(22) Filed: Mar. 16, 2022

(65) Prior Publication Data

US 2022/0415051 A1 Dec. 29, 2022

Related U.S. Application Data

(60) Provisional application No. 63/216,308, filed on Jun. 29, 2021.

(51) Int. Cl.
*G06V 20/52* (2022.01)
*G06V 10/74* (2022.01)
*G06V 40/10* (2022.01)
*G06V 10/82* (2022.01)
*G06N 3/04* (2023.01)

(52) U.S. Cl.
CPC ........... *G06V 20/52* (2022.01); *G06N 3/0454* (2013.01); *G06V 10/74* (2022.01); *G06V 10/82* (2022.01); *G06V 40/10* (2022.01)

(58) Field of Classification Search
CPC ........ G06V 20/52; G06V 10/84; G06V 40/10; G06N 3/0454
See application file for complete search history.

(56) References Cited

U.S. PATENT DOCUMENTS

| | | | | |
|---|---|---|---|---|
| 11,200,407 | B2 * | 12/2021 | Russo | G06V 40/166 |
| 2019/0279052 | A1 * | 9/2019 | Han | G06N 3/0454 |
| 2020/0342586 | A1 * | 10/2020 | Kumar | G06T 7/13 |
| 2021/0019374 | A1 * | 1/2021 | Donaldson | G06N 20/00 |
| 2021/0090284 | A1 * | 3/2021 | Ning | G06V 40/103 |
| 2021/0117662 | A1 * | 4/2021 | Wang | G06Q 50/01 |
| 2021/0127071 | A1 * | 4/2021 | Rebien | H04N 7/18 |
| 2021/0289264 | A1 * | 9/2021 | Booth | G06V 20/52 |
| 2021/0342644 | A1 * | 11/2021 | Skuin | G06T 7/292 |
| 2022/0046385 | A1 * | 2/2022 | Sundararajan | G06N 3/0454 |
| 2022/0100988 | A1 * | 3/2022 | Yamamoto | G06V 40/169 |
| 2022/0148200 | A1 * | 5/2022 | Narroschke | G06T 7/269 |

* cited by examiner

*Primary Examiner* — Kevin Ky
(74) *Attorney, Agent, or Firm* — Dority & Manning, P.A.

(57) ABSTRACT

Methods, systems, and apparatus, including computer programs encoded on computer-readable media, for obtaining a first image from a first sensor; detecting a first object within the first image; extracting discriminative features of the first object into a first feature vector; obtaining a second image from a second sensor; detecting a second object within the second image; extracting discriminative features of the second object into a second feature vector; and determining, based on a comparison between the first feature vector and the second feature vector, that the second object is same as the first object.

19 Claims, 9 Drawing Sheets

OBJECT RE-IDENTIFICATION

CROSS-REFERENCE TO RELATED APPLICATION

This application claims the benefit of U.S. Provisional Application No. 63/216,308, and filed on Jun. 29, 2021, which is incorporated by reference herein in its entirety.

FIELD

This specification generally relates to machine learning networks for object identification and re-identification.

BACKGROUND

Monitoring systems may include one or more sensors that collect data. The data may be processed either using processors onboard the sensor or by sending sensor data to a computer that is configured to process the sensor data. A system may perform one or more operations based on the sensor data including, for example, identification of one or more elements represented in the sensor data and generating alerts based on the identification.

SUMMARY

One innovative aspect of the subject matter described in this specification is embodied in a method that includes obtaining a first image from a first sensor; detecting a first object within the first image; extracting discriminative features of the first object into a first feature vector; obtaining a second image from a second sensor; detecting a second object within the second image; extracting discriminative features of the second object into a second feature vector; and determining, based on a comparison between the first feature vector and the second feature vector, that the second object is same as the first object.

The foregoing and other embodiments can each optionally include one or more of the following features, alone or in combination. For instance, in some implementations, upon determining that the second object is same as the first object, the method may include providing information to a user indicating detection of the second object within the second image.

In some implementations, the information may be provided to the user in response to receiving a request from a user and the request may include instructions indicating that the first object is a target object to be tracked.

In some implementations, the method may further include storing the first feature vector in a feature vector database.

In some implementations, the first sensor and the second sensor may be of different sensor types.

In some implementations, determining that the second object is same as the first object may include calculating one or more distance values corresponding to respective distances between elements of the first feature vector and corresponding elements of the second feature vector; and based at least on the one or more distance values, determining that the second object is same as the first object.

In some implementations, determining that the second object is same as the first object based at least on the one or more distance values may include determining that the one or more distance values satisfy one or more thresholds; and in response to determining that the one or more distance values satisfy the one or more thresholds, determining the second object is same as the first object.

In some implementations, detecting the first object within the first image may include providing the first image to a trained neural network, wherein the trained neural network is configured to detect objects of a type as the first object in images.

In some implementations, an output of the trained neural network may include a portion of the first image corresponding to a bounding box around the first object and the bounding box may include the first object. In some implementations, the portion of the first image corresponding to the bounding box includes a detailed segmentation around the first object. For example, the output of the trained neural network can include the first object extracted from the first image based on the outline of the first object such that only data of the first object is included.

In some implementations, extracting the discriminative features of the first object into the first feature vector may include providing the portion of the first image corresponding to the bounding box around the first object to a second neural network, wherein the second neural network is configured to extract discriminative features into an n-dimensional vector based on a received image portion; and obtaining an output of the second neural network, wherein the output of the second neural network includes the first feature vector.

In some implementations, the second neural network may be configured to extract discriminative features based on the received image portion at one of more levels of granularity.

In some implementations, the one or more levels of granularity may include a first level corresponding to a first section of the received image portion, and a second level corresponding to a second section of the received image portion, the second section being different than the first section.

In some implementations, the first section may correspond to an entirety of the first object, and the second section may correspond to a localized portion of the first object.

In some implementations, the first object may be one of a human or a vehicle. In some implementations, the first object may be an animal, an item of personal property, or a textual representation, among others.

In some implementations, electronic devices, including one or more sensors, may be used to obtain sensor data. For example, a sensor may obtain data that may be extracted into a vector where the vector includes a plurality of features based on the data. The vector may then be compared to one or more stored features in a database. The database may include features corresponding to known individuals or objects as well as unknown individuals or objects. The database may include features based on previously obtained sensor data from two or more sensors with different modalities.

Advantageous implementations can include one or more of the following features. For example, a database may be used to store extracted features from obtained sensor data within an environment. The obtained sensor data may indicate an unknown individual within an area. The unknown individual may be assigned an identifier. If the same unknown individual is again sensed by one or more sensors within a system, the corresponding obtained data may be extracted into one or more features. The subsequent occurrence of the unknown individual may be determined as the same individual as the first occurrence of the unknown individual by comparing the stored extracted features corresponding to the first occurrence with the stored extracted features corresponding to the subsequent occurrence.

In some implementations, users may create a registry of objects for which to search. For example, a user may provide still images or video. Objects detected within the still images or video may be extracted into corresponding features. In some cases, a machine learning network may be trained to extract specific features depending on the object. After extraction, the corresponding extracted features may be stored in a database. When new sensor data is obtained by the system, the sensor data may be similarly extracted into corresponding features and compared with the stored data indicating one or more objects of the registry of objects created by the user. Based on a comparison between the newly extracted features and the stored data, the system can determine subsequent actions to perform. In some implementations, stored data operates as a white list or black list of objects, features, or persons. As an example of a black list, if any feature corresponding to an object in newly obtained sensor data matches stored features of an object on the registry stored in the database, the system may provide an alert to the user indicating that the corresponding object was detected in the newly obtained sensor data.

In some implementations, by extracting the sensor data into feature vectors, a system may compare sensor data between multiple modalities. For example, a system may include a sensor of a first type and a sensor of a second type different than the first type. Without extracting features, comparing the sensor data of the first type and the sensor data of the second type may be computationally demanding and time consuming. A direct comparison of the sensor data may not be accurate as a representation of an object using data of the first type may not be similar to a representation of the same object using data of the second type. By using a trained model to extract similar features from the data of both sensor data types, the differences between the modalities may be minimized and resulting comparison between the extracted features may be more efficient and accurate then a direct comparison of sensor data.

The details of one or more aspects are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

In some implementations, a system may be configured to enroll and track a missing person, fugitive, vehicle, or other object. For example, a system may include one or more sensors that cover a region. To take one instance, a system may detect a hit and run. A vehicle involved in the hit and run may be enrolled in the system and subsequently tracked using other sensors in the region. As discussed herein, each time the vehicle is sensed by one or more sensors of the system, the sensor data may be processed by a trained neural network to extract one or more features into a vector. The vector may then be used to either identify the vehicle as the vehicle involved in the hit and run or another vehicle. A user may request all data corresponding to the vehicle by providing an image or other identifying details of the vehicle or may be alerted automatically by the system based on the events detected by the system.

In some implementations, a system may be configured to enroll and track other objects or persons. For example, the system can be used in public safety implementations for automated contact tracing, such as contact tracing for a contagious illness or some other event. The system can enroll and track specified persons, such as very important persons (VIPs) at premieres, red carpet, or other events. The system can enroll and identify missing children if data indicating a missing child is captured in sensor data available to the system. The system can enroll and track athletes at sporting events, including tracking for sport broadcasting.

Figure 1:
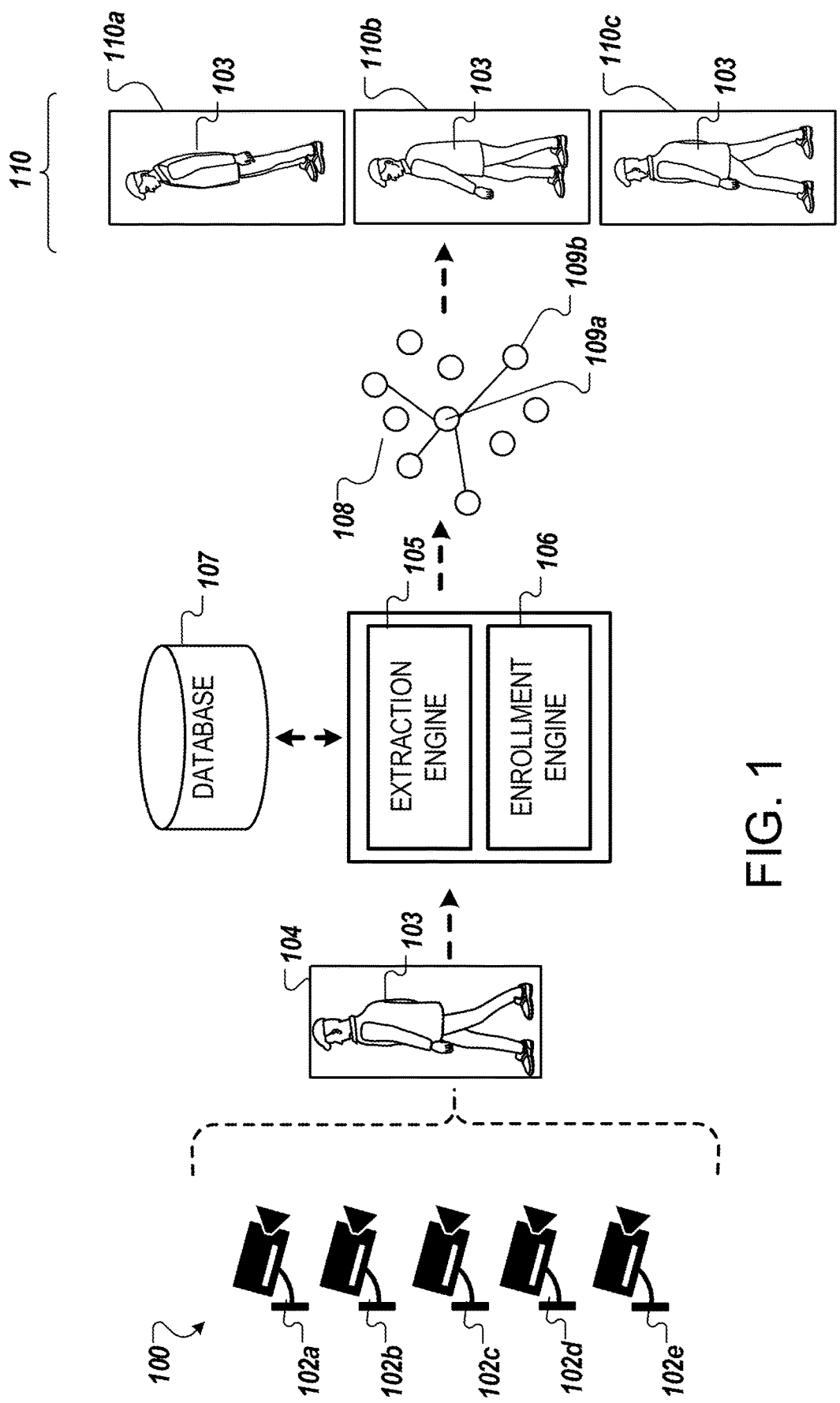
FIG. 1 is a diagram showing an example of a system for object enrollment and re-identification.

FIG. 1 is a diagram showing an example of a system 100 for object enrollment and re-identification. The system 100 includes sensors 102a, 102b, 102c, 102d, and 102e. The sensors 102a-e obtain sensor data in one or more modalities. For example, the sensors 102a-e may include one or more visual sensors including an infrared sensor or digital camera as well as one or more non-visual sensors such as acoustic sensors or a light detection and ranging (LiDAR) sensor, among others.

In some implementations, the sensors 102a-e may include a sensor used for closed circuit television (CCTV) applications. For example, the system 100 may leverage existing systems currently used to provide CCTV data. The system 100 may obtain the CCTV footage as another form of sensor data for processing.

The system 100 may include an extraction engine 105 and an enrollment engine 106. The extraction engine 105 may be configured to extract features from an image, such as image 104 that represents an object 103, and generate a corresponding vector that includes one or more of the extracted features. The extraction engine 105 may provide the extracted feature vector to the enrollment engine 106. The enrollment engine 106 may be communicable connected to a database 107. The enrollment engine 106 may provide the extracted feature vector to the database 107. The database 107 may be configured for later retrieval during a matching or identification process.

In some implementations, the database 107 may include a registry provided by a user. For example, the user may provide one or more images or video segments to the system 100. The extraction engine 105 may extract features from the provided data corresponding to one or more objects within the provided data and store the extracted features within the database 107. As described herein, the system 100 may be configured to provide an alert to the user if an object matching an enrolled object is identified in newly obtained sensor data.

In some implementations, a registry of the database 107 is used to enroll authorized objects. For example, the database 107 can include a white list of objects, individuals, or features that do not generate alerts, and items in the database are not tracked. In some implementations, captured data, such as monitoring data of specific objects or persons on the white list, is not stored in one or more memory locations. In some implementations, the user provides one or more images or video segments to the system 100 and the system 100 enrolls features of the data as authorized objects. For example, the extraction engine 105 may extract features from the provided data corresponding to one or more objects within the provided data and store the extracted features within the database 107. The system 100 can be configured not to provide an alert to the user if an object matching an enrolled object is identified in newly obtained sensor data. The system can be configured to provide an alert to the user if an object not matching an enrolled object is identified in newly obtained sensor data.

In some implementations, the extraction engine 105 may perform one or more operations to identify objects and extract features. For example, the extraction engine 105 may include localization step. A localization step may include determining the location of an object within obtained sensor data. In order to determine the location of the object, the extraction engine 105 may include a trained neural network. The neural network may be trained using a variety of methods. In some cases, the neural network for determining the location of objects may be trained using a real-time object detection framework, such as You Only Look Once (e.g., YOLOv4, YOLOv5, among others), Detectron2, multilayer neural network (MNN), EfficientDet, You Only Learn One Representation (YOLOR), You Only Look Once High Performance (YOLOX), Detection Transformer (DETR), among others.

In some implementations, the extraction engine 105 may perform additional operations to extract one or more features from obtained sensor data. For example, after the localization step described herein, the extraction engine 105 may provide a portion of the sensor data corresponding to the location of an object detected by the trained neural network to a feature extractor. The feature extractor may use an Omni-Scale Network (OSNet) convolutional neural network (CNN) to extract discriminative features. In some implementations, the OSNet uses other detectors such detectors based on Automated Instance Normalization (AIN) or Instance Batch Normalization (IBN) architecture. The OSNet improves on earlier approaches (e.g., ResNet-based models) because it learns and extracts features at different scales, from the whole object to more local features. The features may then be extracted in n-dimensional vector form as a generated feature vector.

The object 103 may be enrolled in a registry of the system 100. For example, in some cases, the object 103 may be detected in sensor data obtained from the sensors 102*a-e*. In some cases, the object 103 may be detected in images uploaded by a user for the purpose of enrolling the object 103. In the example of FIG. 1, the object 103 is a human. However, in other implementations, other objects may be enrolled, including vehicles, animals, text representations, among others.

In some implementations, the system 100 may receive a request from a user to search for the object 103. For example, the system 100 may receive a search request sent by a device of the user communicably connected to one or more components of the system 100. The search request may include an identifier of the object 103, such as the image 104 or other image representing the object 103, a plaintext identifier associated with the object 103 after enrollment, among others. After receiving the search request, the system 100 may perform a search 108.

The search 108 may include identifying one or more feature vectors for comparison. Depending on implementation, the search 108 may include comparing a known feature vector to N different feature vectors stored in the database 107. The search 108 may also include comparing one or more first feature vectors in the database 107 with one or more other feature vectors in the database 107 to determine one or more matches.

In some implementations, the system 100 receives a search request with an identifier of an object, such as an image or unique identifier associated with an object. For example, the system 100 may obtain the image 104 in a search request and generate a feature vector 109*a* corresponding to the object 103 represented in the image 104. In another example, the system 100 may receive an identifier corresponding to the enrolled object 103 and identify a corresponding feature vector 109*a* in the database 107 that matches the identifier.

A search request received by the system 100 may include one or more locations. For example, a search request may include a typed or spoken word request to "show all people who were captured on video at two or more of the following sites: [site 1], [site 2], [site 3], . . . , [site N]". The request may be parsed by the system 100. Each of the sites indicated in the request may be represented using geo-coordinates, addresses, or signifiers associating a word, phrase, or unique identifier, with a location. Each sensor may also be associated with a location where the sensor is located or a sensing area of the sensor. By comparing the data within the database 107 captured by sensors at the locations corresponding to the locations in the request, the system 100 may provide the user with occurrences of people that were captured on video at the sites listed in the request.

The system 100 may perform the search 108 by comparing the feature vector 109*a* corresponding to the object 103 with one or more other feature vectors corresponding to other objects in the database 107. For example, the search 108 may include comparing the feature vector 109*a* to the feature vector 109*b*. In some cases, both the feature vector 109*a* and the feature vector 109*b* may be represented by a plurality of numerical values. In order to compare the feature vector 109*a* to the feature vector 109*b*, the system 100 may generate a difference value for the one or more values of each of the feature vector 109*a* and the feature vector 109*b*. The system 100 may further generate a weighted summation of the difference values that represents the difference between the feature vector 109*a* and the feature vector 109*b*.

By comparing the feature vector 109*a* corresponding to the object 103, the system 100 may generate differences between the feature vector 109*a* and one or more other stored feature vectors of the database 107, where each feature vector of the database 107 may be associated with a corresponding object. In some implementations, each feature vector of the database 107 is further associated with an image or other sensor data type from which the corresponding feature vector was generated.

In some implementations, the search 108 includes one or more components to improve operation accuracy and efficiency. For example, the feature vectors generated by the extraction engine 105 may be stored in a custom vector database for similarity search. In some cases, the open-source vector databases may be used, such as "Milvus". The search 108 may include performing one or more similarity metric calculations including: Euclidian distance, inner product, Hamming distance, Jaccard distance, cosine similarity, among others.

In some implementations, the search 108 may be configured for multiple types of input data. For example, one or more feature vectors associated with a given video clip may automatically be associated based on continuation of movement within the video clip. In this way, multiple angles or perspectives of objects may be correlated in order to increase the number of vectors associated with a given object. In some cases, an average of feature vectors extracted from a given object across a video segment is stored as a feature vector of the object for later identification and comparison. In this way, the system 100 enables data of different types to be compared and searched.

Output 110 of the search 108 performed by the system 100 may include one or more items of sensor data corresponding to feature vectors that were successfully matched. For example, the feature vector 109a and the feature vector 109b may be successfully matched if the difference between the feature vector 109a and the feature vector 109b satisfies a determined threshold value. In some cases, the difference between the feature vector 109a and the feature vector 109b may include computing a Euclidian distance between the feature vector 109a and the feature vector 109b within a multi-dimensional space.

The output 110 includes images 110a, 110b, and 110c. In the example of FIG. 1, the images 110a-c are visual images. However, depending on implementation, the output 110 may include data of any type, such as any data type that is obtained by the sensors 102a-e. The output 110 may include sensor data corresponding to a subset of the feature vectors stored in the database 107 that are chosen based on the value of the difference between them and one or more other feature vectors.

In some implementations, the search 108 may determine a ranking of one or more differences corresponding to differences between two or more feature vectors. The system 100 may determine, based on the differences between the two or more feature vectors, a number of feature vectors that satisfy a threshold difference value.

In some implementations, the system 100 may obtain a threshold indicating a number of vectors and obtain the number of vectors corresponding to the threshold. For example, the system 100 may obtain a threshold of 3 feature vectors. The system 100 may sort the differences between two or more feature vectors and choose the 3 feature vectors that correspond to the most closely matched vectors, such as the 3 feature vectors with the lowest difference values. In general, any amount of sensor data corresponding to one or more feature vectors may be provided to the user. In some cases, a user may preconfigure a threshold used by the system 100 for determining the chosen feature vectors.

In some implementations, without a request from the user, the system 100 may correlate the output 110. For example, instead of waiting for a request, the system may automatically enroll objects and search for other occurrences within stored feature vectors based on the database 107. In this way, the system 100 may issue alerts when a certain threshold is satisfied based on a number of occurrences of an object. For example, if an object is seen in a certain number of locations or a certain number of times, the system 100 may alert the user and provide corresponding data, such as corresponding sensor data stored in the system 100. The user need not send a request to receive alerts to multiple occurrences or patterns of behavior from objects detected by the system 100.

In some implementations, the output 110 may include one or more items of related data. For example, the output may include a source file that includes corresponding sensor data as well as a frame number in the case where the sensor data includes one or more video files.

In some implementations, as disclosed herein, the system 100 may automatically correlate sensor data as including the same or similar object. For example, the system 100 may correlate related objects or obtained sensor data into sets. The system 100 may provide automatically generated sets to a user of the system 100. The system 100 may provide the sets in response to a request or in response to a discriminative threshold such as a number of occurrences or other characteristics of a set such as a length of time or pattern of occurrences, e.g., an object typically appears at a certain place or at a certain time or is associated with other events.

Figure 2:
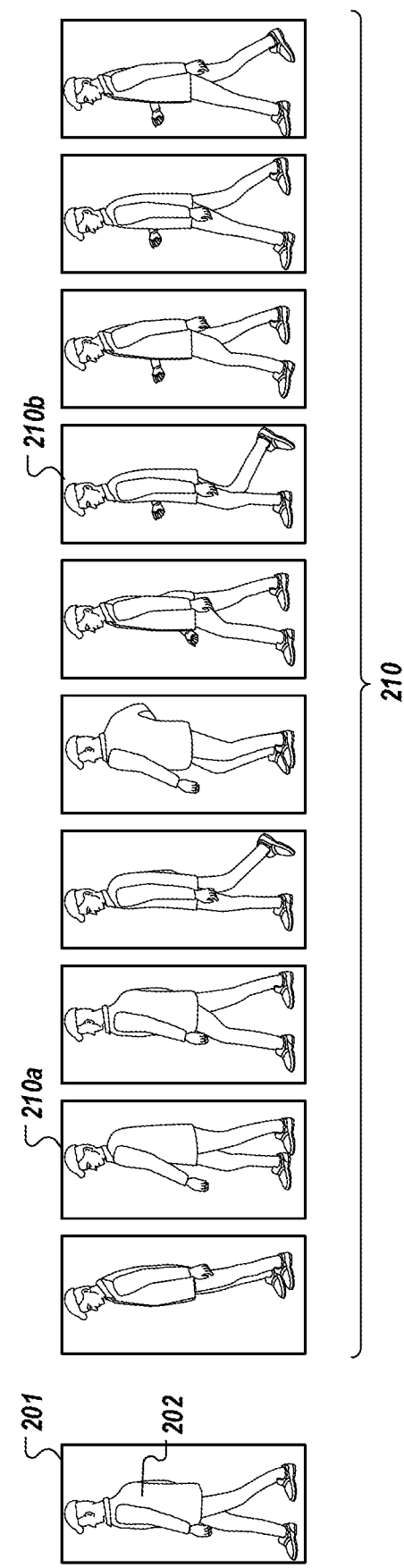
FIG. 2 is a diagram showing a variety of images that may be matched based on corresponding extracted features.

FIG. 2 is a diagram showing a variety of images that may be matched based on corresponding extracted features. As discussed herein, an extracted feature vector corresponding to image 201 may be compared to a plurality of feature vectors corresponding to images 210. For example, the image 201 may be provided to a system, such as the system 100, as part of a search request and used to determine other sensor data that matches one or more objects in the provided image 201.

In the example of FIG. 2, the image 201 includes object 202. In this example, the object 202 is a human but, in general, any object or feature of an input data item may be used to search a database including a unique identifier corresponding to an enrolled or auto-enrolled target.

As discussed herein, the image 201 may be provided to the system 100. The system 100 may extract features from the image 210 to generate an extracted feature vector. The feature vector may be enrolled and stored in the database 107 or may be directly used in the search 108 to identify matches to data stored in the database 107.

In some implementations, an extracted feature vector generated based on the image 201 is used in a process similar to the search 108 described herein. For example, the vector corresponding to the image 201 may be compared with one or more other vectors corresponding to other sensor data. As shown in FIG. 2, the vector corresponding to the image 201 may be matched with vectors corresponding to image 210a and image 210b of the images 210.

The images 210a and 210b may not be of the same modality. For example, the image 210a may be obtained from a high-resolution monitoring camera while the image 210b may be obtained from a legacy CCTV camera. In some cases, the image 210a may be obtained from an infrared sensor or sensor configured to obtain sensor data. Although the data types may be different, by extracting features as discussed herein, a system, such as the system 100 may determine that both a vector corresponding to the image 210a and a vector corresponding to the image 210b satisfy determined difference threshold and match the vector representing the image 201.

As shown in FIG. 2, the image 210b slightly distorts the proportions of the object 202 compared to the image 210a. However, because extracted features are being compared instead of original sensor data, the eccentricities of a given modality, which may result in one or more distortions or modifications to a representation of an object, may not affect a resulting comparison between sensor data of different modalities. In this way, sensor data from a broad range of sensors may be used thereby improving the likelihood of capturing more occurrences of various objects or features.

As discussed herein, after determining the images 210 match the object 202 as represented in the image 201, a system, such as the system 100, may provide the images 210, as well as other related information, to a user of the system. In some cases, the data may be provided in response to receiving a request including the image 201.

In some implementations, the identification of a correlation between one or more objects identified by a system may result in an automatic action. For example, the correlation of multiple occurrences of the object, including a correlation of time using a timestamp corresponding to the obtaining of the sensor data, may be used to determine a direction of the object. In some cases, a human or vehicle may be approaching a secured area. After determining that the human or vehicle is approaching the secured area, the system may send a notification to a corresponding user at the secured area of in charge of the secured area. In some cases, the system may further send a signal to secure a portion of the secured area. For example, the system may send a signal to lock a door or entry gate of a building to prevent the human or vehicle from entering the secured area. In general, other automatic actions may be configured depending on implementation.

Figure 3:
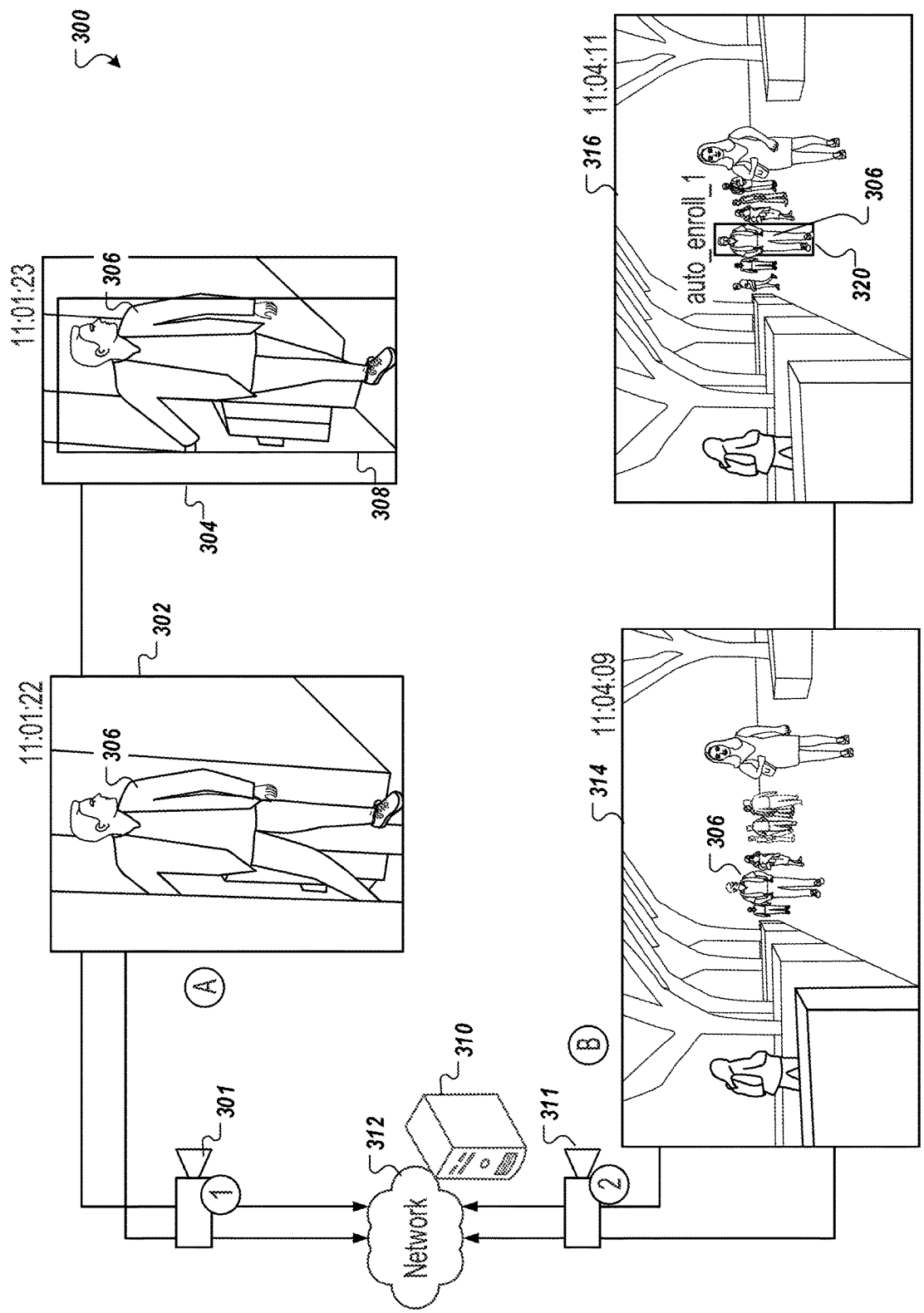
FIG. 3 is a diagram showing an example of a system for object re-identification.

FIG. 3 is a diagram showing an example of a system 300 for object re-identification. The system 300 may include a first sensor 301 and a second sensor 311 configured to obtain sensor data within one or more environments. The system 300 may also include a control unit 310 that is communicably connected to the first sensor 301 and the second sensor 311 by a network 312. The network 312 may be any suitable form of wired or wireless network configured to transfer data from one entity to another.

At stage A of FIG. 3, the first sensor 301 may obtain image 302 at a first time and image 304 at a subsequent time. Both the image 302 and the image 304 represent, among other things, a human object 306. The object 306 is entering a hallway. The first sensor 301 may send the image 302 to the control unit 310 which may then auto-enroll the object 306 for later identification. As discussed herein, the control unit 310 may extract a feature vector corresponding to features of the object 306 as represented by the image 302.

Similar to the system 100, the control unit 310 may extract a feature vector corresponding to the image 302 and store the auto-enrolled object in a corresponding database. Upon receiving the subsequent image 304 obtained by the first sensor 301, the control unit 310 may again extract a feature vector corresponding to the image 304 and compare the extracted feature vector corresponding to the image 304 with one or more extracted feature vectors stored in a corresponding database communicably connected to the control unit 310.

Based on one or more comparisons between the vector corresponding to the object 306 represented in the image 302 and the vector corresponding to the object 306 in the image 304, the control unit 310 may determine that the object 306 in the image 304 is the same object as in the image 302. For a display of a user, the control unit 310 may provide a bounding box visualization to identify the enrolled object corresponding to the object 306 as shown as bounding box 308.

In some implementations, the control unit 310 compares an extracted vector to multiple stored feature vectors. For example, the control unit 310 can extract a feature vector from the image 304. The control unit 310 can provide the image 304 to an extraction engine, such as the extraction engine 105. In some implementations, the control unit 310 performs operations of the extraction engine. In some implementations, the control unit 310 is communicably connected to one or more processors configured to perform the operations of the extraction engine. The extraction engine can extract one or more macro-features and one or more micro-features. Macro-features can include color within an image, size of an object or person represented in an image, number of distinct objects, among many others. Micro-features can include indications of smaller artifacts represented in an image, such as glasses worn by a user, facial complexion, symbols, text, among others. The extraction engine can assign one or more values in a vector to specific macro or micro features extracted from an image. One or more additional vectors stored in a database, such as the database 107, can include the same macro or micro features. The control unit 310 can obtain those vectors with the same features and compare those vectors with newly generated vectors that have the same one or more features.

In some implementations, the control unit 310 generates one or more values based on comparing feature vectors. For example, the control unit 310 can generate a distance measure between a set of one or more values, for one or more features represented in a first vector, and a different set of one or more values, for the same one or more features represented in a second vector.

In some implementations, the control unit 310 generates clusters of vectors based on determining one or more comparison values satisfy a threshold. For example, the control unit 310 can generate a geometric distance between two vectors. The control unit 310 can compare the geometric distance to a threshold distance. If the geometric distance satisfies the threshold distance (e.g., the geometric distance is less than or equal to the threshold distance), the control unit can include the two vectors in a vector cluster. The control unit 310 can similarly compare newly obtained feature vectors to one or more of the two vectors, or an average of the two vectors, to determine if the newly obtained feature vector is to be added to the cluster or should be included in another cluster, or form a new cluster.

In some implementations, the control unit 310 generates clusters for specific identification purposes. For example, the control unit 310 can generate a first cluster based on enrolling a first person. Enrolling the first person can include obtaining one or more images of the first person, extracted feature vectors of the one or more images, and generating a vector cluster from the extracted feature vectors. For subsequent identification, the control unit 310 can obtain new sensor data, extract a feature vector from the sensor data, and compare the feature vector to the generated vector cluster to generate one or more comparison values. If one or more comparison values, generated by comparing the feature vector to one or more vectors of the generated vector cluster or data corresponding to one or more vectors, such as an average of two or more vectors of the generated vector cluster, satisfy a comparison threshold, the newly extracted feature vector can be identified, by the control unit 310, as representing the first person. Corresponding sensor data used to obtain the newly extracted feature vector can then be identified as likely including a representation of the first person.

In some implementations, the control unit 310 performs one or more processes to generate one or more vector clusters. For example, the control unit 310 can perform comparisons on a set of vectors. The control unit 310 can generate a comparison value, such as a distance value, for each vector compared to one or more other vectors in the set of vectors. The control unit 310 can identify clusters based on strict or dynamic threshold. For example, the control unit 310 can use k-mean clustering or other dynamic clustering methods to determine thresholds to identify clusters. The control unit 310 can use set thresholds specified by users, such as 500 distance units. If a comparison between two vectors generates comparison values that satisfy a comparison threshold, the control unit 310 can combine the two vectors into a cluster. After assigning each vector to a cluster, the control unit 310 can determine an overlap of the generated clusters.

In some implementations, the control unit 310 determines overlap of clusters based on multi-dimensional space. For example, a cluster can include one or more vectors in a multi-dimensional space. For each dimension, there can be a vector that has a maximum value in that dimension. In some implementations, volume of a cluster is generated based on maximum values within a cluster. In some implementations, volume is weighted based on the average value of dimension values. Multi-dimensional volume can then be used to indicate overlap between vectors where each volume of each cluster is situated in space based on the corresponding dimensional values of each feature within each feature vector.

In some implementations, the control unit 310 combines two or more clusters if an overlap of the clusters satisfies a threshold. For example, the control unit 310 can determine the amount of overlap between a first and second cluster. The control unit 310 can compare the amount of overlap to a threshold level of overlap and determine, based on the comparison to the threshold, whether to combine the clusters. In some implementations, a percentage threshold is used. For example, the control unit 310 can determine the amount of overlap between a first and second cluster is 86%. The control unit 310 can compare the overlap to a threshold level of 85%. In this case, satisfying the threshold can include the determined overlap being equal to or greater than the threshold level. In other implementations, other conditional statements can be used. In this case, the control unit 310 can combine the first and second cluster to form a single cluster that includes the vectors of both the first and second vector clusters.

In the scenario depicted in FIG. 3, the human object 306 may proceed from inside a building to a street. The system 300 may leverage sensors located both within the building and on the street in order to provide a seamless tracking experience. For example, the first sensor 301 may be located within a hotel providing CCTV for the hotel. The second sensor 311 may be located on a street. As discussed, the first sensor 301 and the second sensor 311 may be different modalities but resulting sensor data may be compared by extracting corresponding feature vectors for the obtained sensor data.

At stage B, the second sensor 311 obtains both image 314 and a subsequent image 316. Both the image 314 and 316 depict the object 306. The control unit 310 may provide a real-time tracking visualization. For example, as the data stream including the image 314 and the image is obtained by the control unit 310 from the second sensor 311, the control unit 310 may process the images to determine one or more objects depicted within the data. The control unit 310 may process the image 314 and detect the object 306. The control unit 310 may again extract a feature vector and compare it with other vectors obtained from a connected database in order to determine that the object 306 corresponds to an enrolled object.

After determining that the image 314 includes the object 306 which has been enrolled, the control unit 310 may provide a visualization, such as bounding box 320, that includes information corresponding to the object 306, such as a unique identifier. The unique identifier may be used to query the system 300 in order to obtain one or more occurrences of the object 306 as identified by the system 300.

In some implementations, the system 300 may provide live tracking in which objects are bounded with enrolled information in real-time. In some implementations, the system 300 may obtain a request to provide sensor data corresponding to an image or other sensor data depicting the object 306 or a unique identifier associated with the object 306. In response to such a request, the system 300 may provide sensor data that depicts a version of the object 306. For example, the system 300 may provide output that includes the images 302, 304, 314, and 316 to the user in response to a request for sensor data that shows occurrences of the object 306.

In some implementations, instead of centrally processing the sensor data, processors of sensors may process data or identify objects. In this way, bandwidth requirements may be reduced and speed of identification may increase. By increasing the speed of identification and processing, using, for example, edge computing for identification, the system 300 may also prevent latency issues which may affect the ability to identify one or more objects. For example, processes discussed herein attributed to the control unit 310 may be performed by either or both the first sensor 301 and the second sensor 311. In some cases, the first sensor 301 may perform a localization step as described in reference to the extraction engine 105. The first sensor 301 may then send only the relevant portions of the sensor data to the control unit 310 for further processing and storage.

In some implementations, a sensor of a system may generate a feature vector. For example, after performing the localization step and determining a location of the object, the first sensor 301, or a processor communicably connected to the first sensor 301, may generate a feature extracted vector. The vector may correspond to the object 306. The first sensor 301 may send only the feature vector instead of sending sensor data, thereby reducing bandwidth requirements of the network 312 and increasing efficiency of the identification process. The edge computing of sensors within a system may be enabled by the particular process of identification as described in reference to FIG. 1 which, by keeping processing requirements minimal, may enable lower cost processors, such as processors that may be included in sensors of a system, to perform processes attributed to control units herein, such as identification, enrollment, searching, re-identification, among others.

Figure 4:
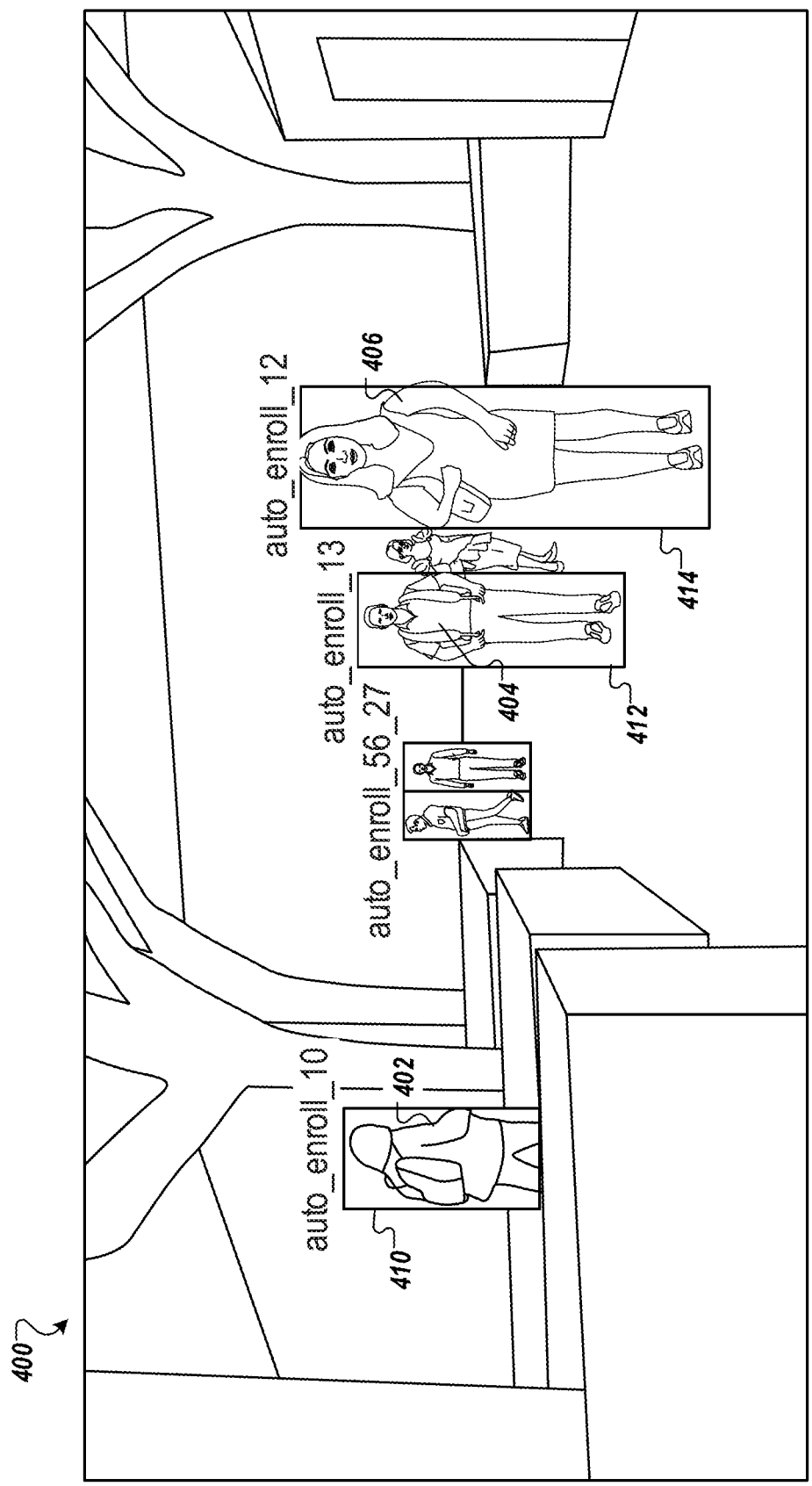
FIG. 4 is a diagram showing an example of auto-enrollment and identification.

FIG. 4 is a diagram showing an example of auto-enrollment and identification. Image 400, similar to the images 314 and 316 of FIG. 3, show objects. In this example, the objects are humans. The image 400 is obtained by a sensor of a system, such as the system 300 or the system 100. As a result, the image 400 may be processed by a control unit and used to auto-enroll one or more objects depicted in the sensor data.

In some implementations, auto-enrollment may be disabled. For example, to ensure privacy, a system may be configured not to auto-enroll objects for later re-identification. In some cases, auto-enrollment may be configured to only auto-enroll objects if the object is within a discriminative area, such as an area of a business enterprise or other secured area including private property. The system may obtain sensor data and detect objects within the sensor data. If the objects are determined to be within the discriminative area, the system may then store the corresponding data and enroll any objects within the predetermine area for later re-identification.

A sensor capturing the image 400 may be set on a street outside of a business or in another location. The image depicts, among others, an object 402, an object 404, and an object 406. Each of the objects 402, 404, and 406 are human objects. As discussed in reference to FIG. 3 and FIG. 1, the image 400 may be processed and corresponding vectors for one or more detected objects may be generated and compared with previously generated and stored vectors. If no matches are found, an object may be enrolled. Both newly enrolled objects and previously enrolled objects, that are re-identified, may be shown with bounding boxes (e.g., items 410, 412, and 414) to visualize the tracking performed by a system using the input of the image 400.

Figure 5:
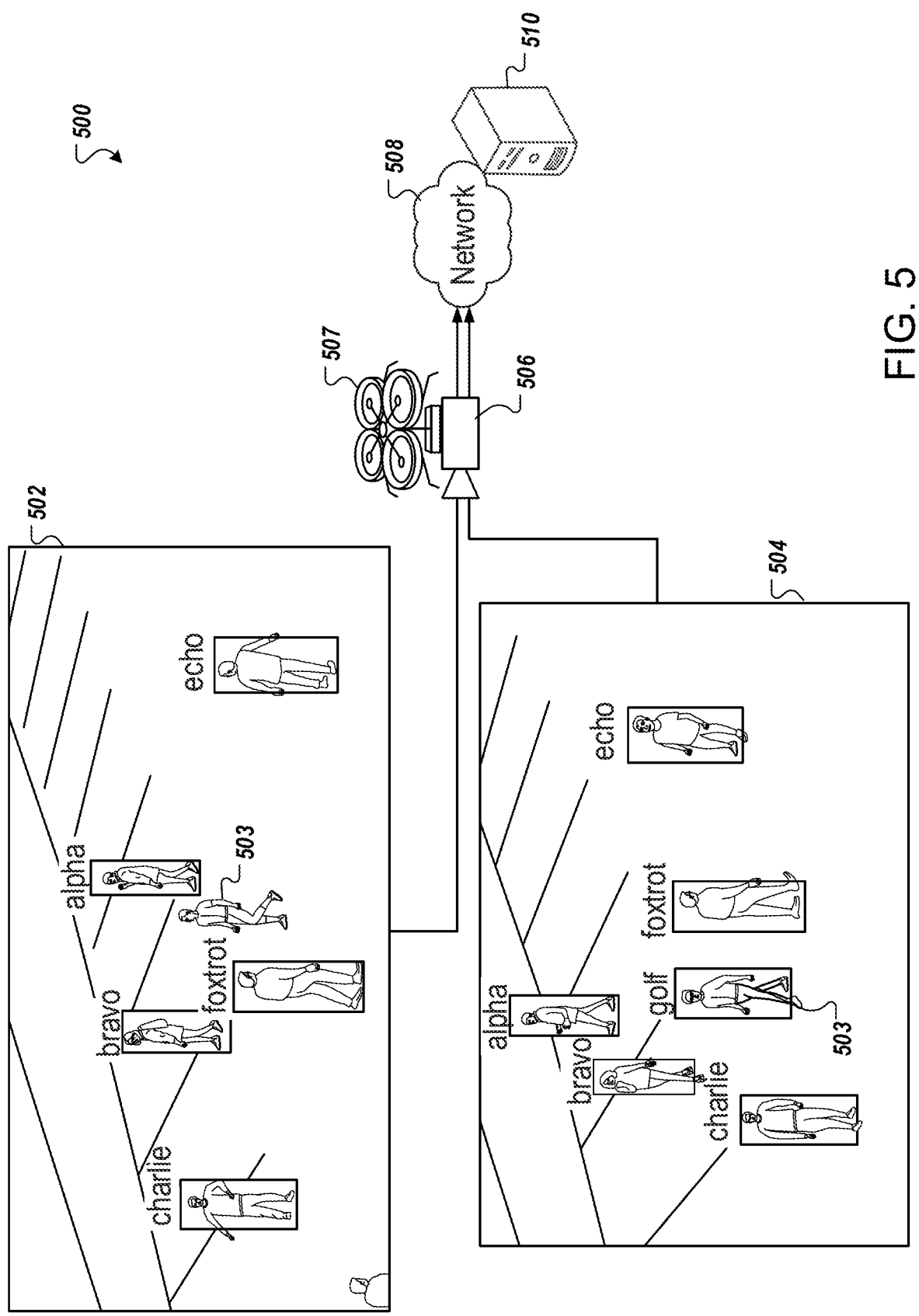
FIG. 5 is a diagram showing an example of object re-identification using a drone.

FIG. 5 is a diagram showing an example of object re-identification using a drone. Similar to FIG. 4, FIG. 5 shows a system 500 that uses sensor data, and a process of feature vector extraction based on the sensor data input, in order to identify objects within the sensor data. As shown in images 502 and 504, sensor 506 affixed to drone 507 obtains aerial footage of people in an environment. In the image 502, unique identifiers "alpha", "bravo", "charlie", "echo", and "foxtrot" are used to identifier the five objects currently identified in the image 502.

The image 502 may be obtained by the sensor 506 and sent to control unit 510. The sensor 506 may be communicably connected to the control unit 510 by network 508. Similar to the control unit 310, the control unit 510 may be configured to extract one or more features based on one or more detected objects within the obtained image 502.

In this example, the image 502 includes an object 503 that is not enrolled. The control unit 510 may, in a similar manner to the enrollment processed discussed herein, detect the object 503 and generate a feature vector corresponding to the object 503 that may be compared with one or more other feature vectors stored in a database communicably connected to the control unit 510. No feature vectors successfully match the vector corresponding to the object 503. In this case, the system 500 may enroll the object 503 in the system 500 for re-identification in subsequent data, or previous data if applicable (e.g., data collected at a previous time may not have been processed in real time or processed at all).

After the object 503 is enrolled, the sensor 506 may obtain the image 504 that similarly includes the object 503. In the same manner, the control unit 510 may extract feature vectors from the objects depicted in the image 504 and determine that the object 503 corresponding to an enrolled object with an identifier "golf". In some cases, unique identifiers may be set by a user or may be automatically generated by the system 500.

In a similar manner to the other enrolled objects, the system may provide a visualization to a device of the user showing a bounding box around each of the objects in the image 504 including the object 503.

Figure 6:
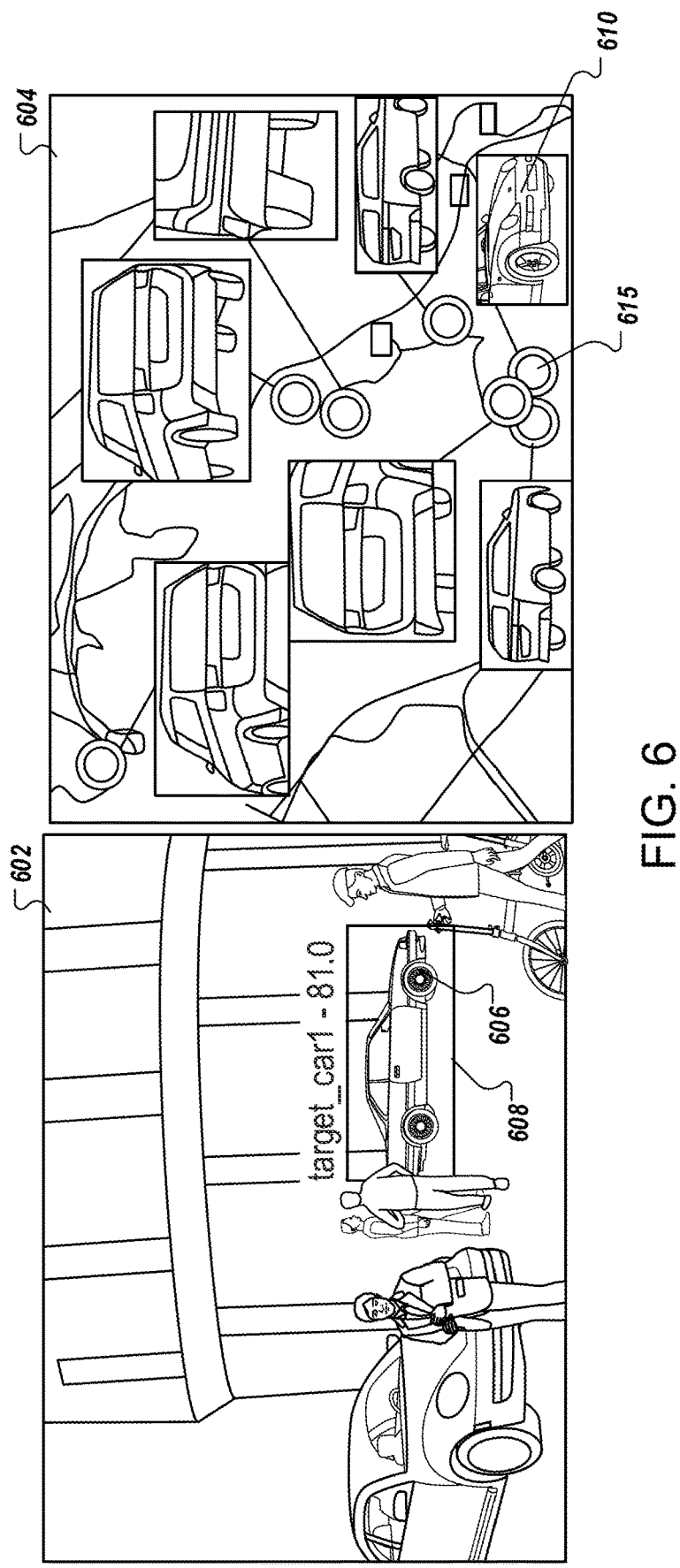
FIG. 6 is a diagram showing enrollment of an object and subsequent identification using sensors of a system.

FIG. 6 is a diagram showing enrollment of an object and subsequent identification using sensors of a system. FIG. 6 shows an image 602 in which an object 606 is enrolled in a system. The system may be similar to any of the systems discussed herein, such as the system 100 and the system 300. The system of FIG. 6 may provide a visualization in the form of a bounding box 608 around the object 606. In this example, the object 606 is a vehicle. The system of FIG. 6 may include a confidence value associated with the object 606. In this case, the confidence value is "81.0" on a scale of 0 to 100. In general, any appropriate scale, numerical or otherwise, may be used to determine a confidence value of an identified object.

In some implementations, the confidence value may represent a likelihood that the system has identified the particular object. For example, the object 606 may have been previously enrolled. The image 602 may represent a subsequent image after enrollment. In this case, the confidence value of "81.0" may represent the confidence value with which the system of FIG. 6 matches the object 606 represented within the image 602 to other known instances of the object 606.

In some implementations, the confidence value may be computed based on one or more difference values associated with feature vector matching. For example, the feature vector associated with an extracted feature vector corresponding to the object 606 as represented in the image 602 may be compared to other extracted feature vectors in a database associated with the object 606. The values of one or more of the differences corresponding to the computed differences between values of the two or more feature vectors may be combined to generate a confidence value. For example, the difference values may be averaged and then mapped to a confidence value range (e.g., 0 to 1, 0 to 100, among others).

In some implementations, the confidence value may represent a confidence value for a particular type of object. For example, the system of FIG. 6 may detect the object 606 and determine that it is likely a car based on previously obtained sensor data that depicts a car. The system of FIG. 6 may determine, with a confidence value of "81.0" that the object 606 is a car. In some cases, the confidence value may be output directly from a neural network trained to detect the type of objects within obtained sensor data.

The image 602 may be obtained by one or more sensors configured to obtain sensor data for the system of FIG. 6. As the object 606 moves, other sensors of the system may obtain more sensor data. The system of FIG. 6 may use the enrollment of the object 606 to perform re-identification when the sensor data includes data indicating the object 606. As discussed herein, the new sensor data may be used to generate a feature vector that may be compared with the enrolled one or more feature vector associated with the object 606 to determine if the new instance of the object 606 is actually the object 606.

The image 604 is a diagram showing how an object 610 may be tracked as it travels. Item 615 indicates a location on a map of a first instance of the object 610 which happens to be a car. As discussed herein, any object may be tracked with the methods discussed herein without limitation.

For example, the object 610 may be traveling along a road network with traffic cameras. The traffic cameras may be sensors of the system of FIG. 6 and provide their sensor data to a control unit of the system. The control unit may process the sensor data as described herein in order to detect one or more objects in the sensor data and generate one or more corresponding feature vectors in order to determine if any object may be enrolled or re-identified. In this case, the control unit may re-identify the object 610 in multiple locations along the route shown in image 604. Response to the tracking shown in image 604, the system of FIG. 6 may send one or more alerts or data to a user. Similarly, as discussed herein, the sensor data obtained may be provided to a user of the system upon request.

In some implementations, enrollment of an object can include full image matching. For example, in the case of television broadcasts, movies, internet streams, or the like, parties may wish to detect content matching specific criteria that is currently streaming on a network or Internet site. In some implementations, a control unit, such as the control unit 310 of system 300, obtains specific images and obtains sensor data from various image streams to potentially re-identify the specific images in the image streams. For example, the control unit can obtain images indicating a specific movie. For one or more images of the specific movie, the control unit can extract feature vectors as described herein. The control unit can obtain sensor data including data captured from streaming Internet sites, public television, cable, or the like. The control unit can extract feature vectors from the sensor data and compare the newly extracted features to the extracted movie features. Based on one or more comparison values, the control unit can determine whether or not a portion of the sensor data includes images of the movie. Other images such as news broadcasts, internet videos, copyrighted paintings, among many others can similarly be enrolled and identified in this way.

In some implementations, a control unit, such as the control unit 310 generates one or more vector cluster to identify a particular set of images. For example, the control unit can obtain images of a news broadcast. The control unit can generate one or more clusters that each identify portions of the news broadcast. The control unit can extract feature vectors from obtained sensor data and compare the newly extracted feature vectors to one or more vectors of the clusters, a mean of one or more of the clusters, or other data corresponding to one or more of the clusters to generate one or more comparison values. Based on the one or more comparison values satisfying a threshold, the control unit can identify particular sensor data as including the particular set of images, such as images of a news broadcast, internet video, movie, among others.

Figure 7:
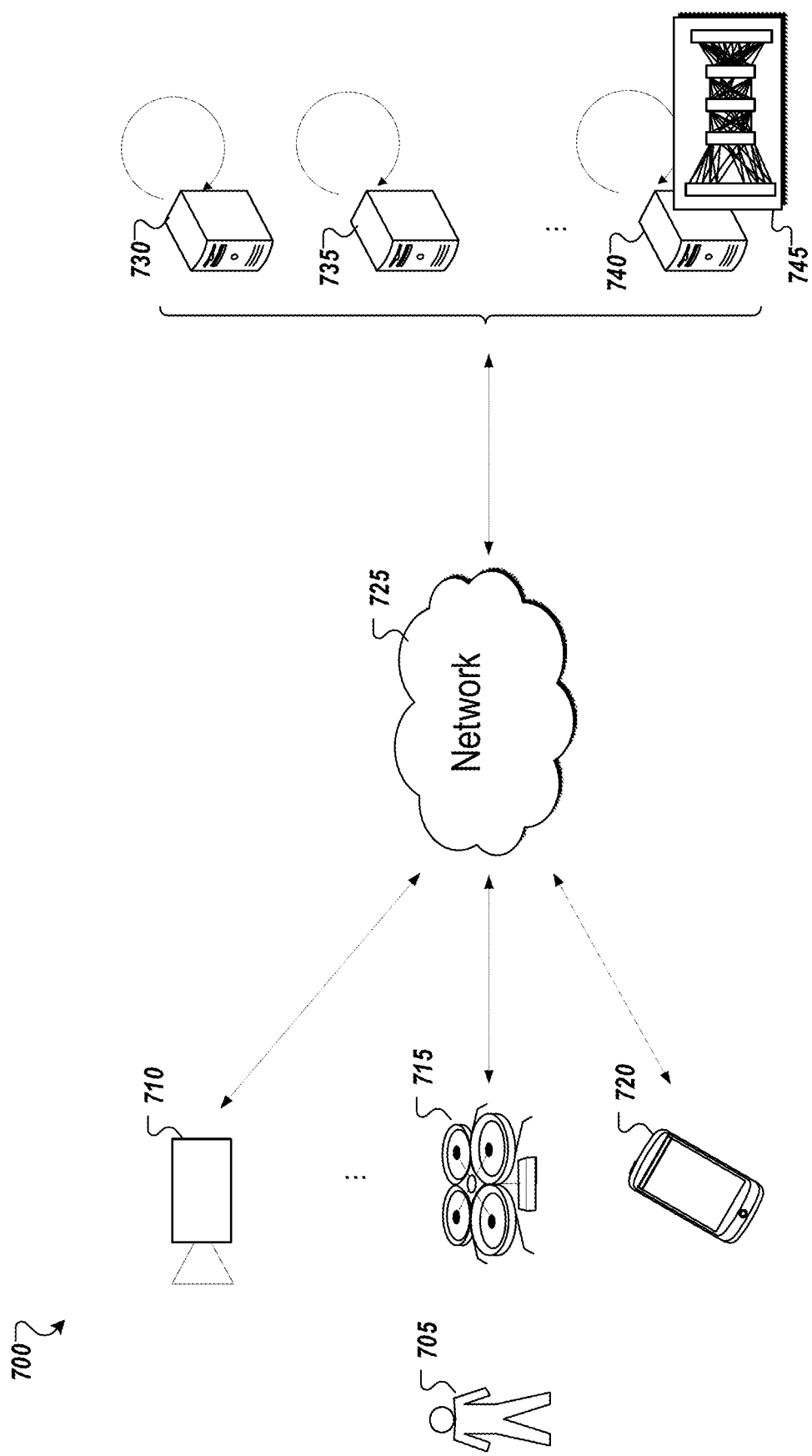
FIG. 7 is a diagram showing an example of a system for obtaining sensor data.

FIG. 7 is a diagram showing an example of a system 700 for obtaining sensor data. In general, the system 700 may be used to obtain sensor data for any system including the system 100 of FIG. 1, the system 300 of FIG. 3, and the system 500 of FIG. 5.

The system 700 includes a plurality of devices for obtaining sensor data including a visual sensor 710, a drone 715, and a smartphone 720. The system 700 includes a network 725 that may be used to send sensor data collected by the system 700 to processing components including processing component 730, processing component 735, and processing component 740.

In some implementations, the visual sensor 710 may be a camera. For example, the visual sensor 710 may be a camera that is configured to capture visual images of objects or environments. The visual sensor 710 may be attached to another device of the system 700. For example, the visual sensor 710 may be attached to the drone 715. In this way, the drone 715 may be configured to maneuver the visual sensor 710 in order to obtain sensor data from different viewing angles.

In some implementations, the drone 715 may be capable of autonomous movements. For example, the drone 715 may be equipped with propellers or other propulsion devices to move within an area. The drone 715 may be equipped with one or more sensors in order to move within a given space.

The smartphone 720 may be equipped with one or more sensors configured to obtain sensor data from a surrounding area. The sensor data from the surrounding area may be sent to processing devices of the system 700 or may be processed directly by computing elements of the smartphone 720.

The system 700 may use one or more devices, such as the camera 710, the drone 715, and the smartphone 720 to capture sensor data of an object or environment. in FIG. 7, the devices of the system 700 capture sensor data of person 705. The sensor data from the one or more devices of the system 700 are sent to one or more processing components of the system 700 or processed locally and a respective local device used to capture the sensor data.

In the example of FIG. 7, the sensor data captured by the devices of the system 700 are sent over the network 725 to the processing components including the processing component 730, the processing component 735, and the processing component 740. Depending on implementation, the processing components may perform one or more processing actions in response to a request to perform a corresponding action or after obtaining corresponding sensor data.

In some implementations, one or more processing components of the system 700 may use one or more neural networks to process obtained sensor data. For example, the processing component 740 may use neural network 745 to process one or more components of the obtained sensor data. The neural network 745 may be trained using one or more sets of training data corresponding to sensor data obtained by devices of the system 700 or other devices.

Processing results obtained by processing components of the system 700 may be sent to a user, stored, or sent back to one or more devices for further obtaining of sensor data or to be provided to a user. In some cases, processing results of the processing components of the system 700 can include identification results, such as an identification of the person 705 as corresponding to the known individual "John Smith". In general, any object may be identified by corresponding processes performed by the processing components of the system 700. In addition, sensor data obtained by the devices of the system 700 may be processed and re-rendered as data of another type or as data from a different sensor. In some cases, this data may be used for additional processes such as event driven fusion, identification, or alerting the user to one or more items of interest based on discriminative rules.

Figure 8:
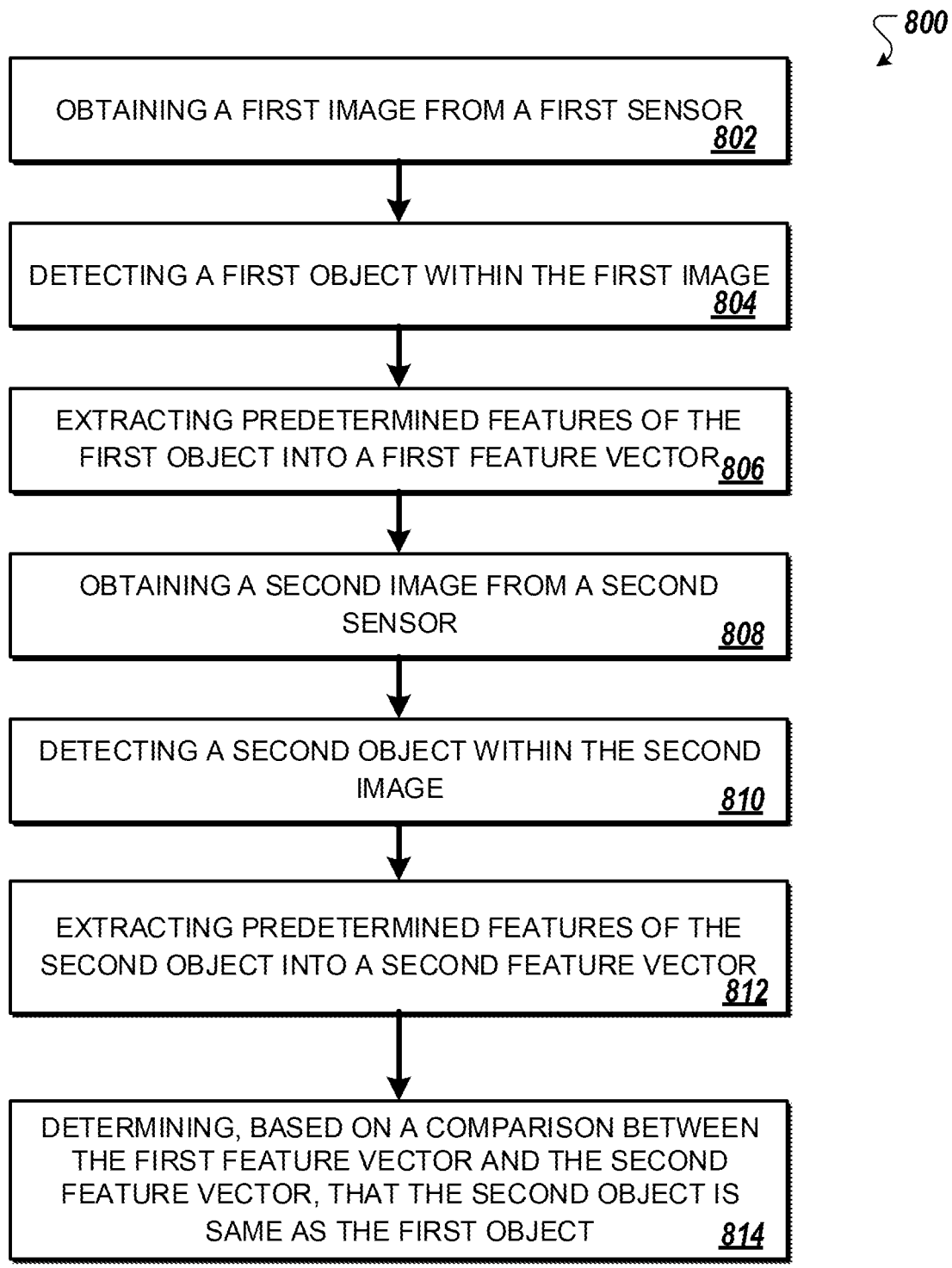
FIG. 8 is a flow diagram illustrating an example of a process for object re-identification.

FIG. 8 is a flow diagram illustrating an example of a process 800 for object re-identification. The process 800 may be performed by one or more electronic systems, for example, the system 100 of FIG. 1 and the system 300 of FIG. 3.

The process 800 includes obtaining a first image from a first sensor (802). For example, as shown in FIG. 3, the first sensor 301 obtains the image 302.

The process 800 includes detecting a first object within the first image (804). For example, the control unit 310 receives the image 302 and identifies the object 306 within the image 302.

The process 800 includes extracting discriminative features of the first object into a first feature vector (806). For example, as described in reference to FIG. 1, the extraction engine 105 may extract features from the image 104 corresponding to the object 103.

The process 800 includes obtaining a second image from a second sensor (808). For example, as shown in FIG. 3, the second sensor 311 obtains the image 314 and sends the image 314, or data corresponding to the image 314, to the control unit 310.

The process 800 includes detecting a second object within the second image (810). For example, the control unit 310 detects the object 306 in the image 316 and marks the object 306 with the bounding box 320.

The process 800 includes extracting discriminative features of the second object into a second feature vector (812). For example, the control unit 310 extracts features of the object 306 as depicted in the image 314 and the image 316.

The process 800 includes determining, based on a comparison between the first feature vector and the second feature vector, that the second object is same as the first object (814). For example, the control unit 310 compares the feature vector corresponding to the object 306 as depicted in the images 302 and 304 to the feature vector corresponding to the object 306 as depicted in the images 314 and 316. In some cases, a process similar to the search 108 may be used to determine the at least two feature vectors match.

Figure 9:
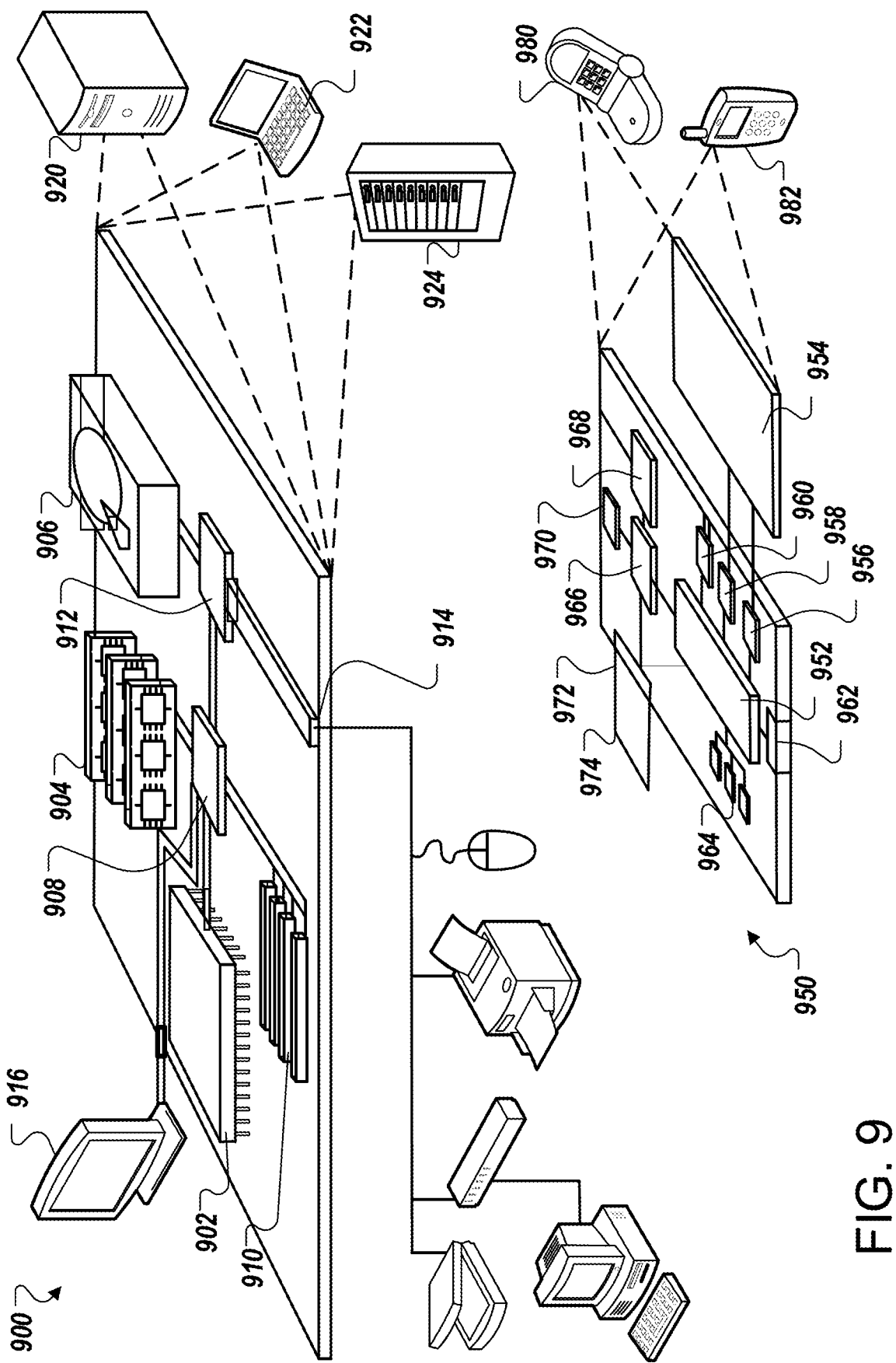
FIG. 9 is a diagram showing an example of a computing system used for object re-identification.

FIG. 9 is a diagram illustrating an example of a computing system used for object re-identification. The computing system includes computing device 900 and a mobile computing device 950 that can be used to implement the techniques described herein. For example, one or more components of the system 100 could be an example of the computing device 900 or the mobile computing device 950, such as a computer system implementing the extraction engine 105, the enrollment engine 106, a component of the system 100 that performs the search 108, or a server that accesses or stores information regarding the operations performed by the system 100. As another example, one or more components of the system 300 could be an example of the computing device 900 or the mobile computing device 950, such as the control unit 310, or a server that accesses or stores information regarding the operations performed by the system 300. As another example, one or more components of the system 500 could be an example of the computing device 900 or the mobile computing device 950, such as the control unit 510, or a server that accesses or stores information regarding the operations performed by the system 500.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine readable mediums (for example, the memory 904, the storage device 906, or memory on the processor 902). The high-speed interface 908 manages bandwidth-intensive operations for the computing device 900, while the low-speed interface 912 manages lower bandwidth-intensive operations. Such allocation of functions is an example only. In some implementations, the high speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may include appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry in some cases. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 9G/6G cellular, among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, among others) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for detecting objects in sensor images, the method comprising:
   obtaining a first image from a first sensor;
   detecting a first object within the first image;
   extracting discriminative features of the first object into a first feature vector;
   comparing the first feature vector to each vector cluster of a plurality of vector clusters composing a feature vector database, each vector cluster of the plurality of vector clusters having a unique identifier;
   associating the first feature vector with a first unique identifier of a first vector cluster when a comparison threshold is met as a result of the comparing the first feature vector to the first vector cluster of the plurality of vector clusters;
   obtaining a second image from a second sensor;
   detecting a second object within the second image;

extracting discriminative features of the second object into a second feature vector;

comparing the second feature vector to each vector cluster of the plurality of vector clusters composing the feature vector database;

associating the second feature vector with the first unique identifier when the comparison threshold is met as a result of the comparing the second feature vector to the first vector cluster of the plurality of vector clusters; and determining, based on the association of the second feature vector with the first unique identifier, that the second object is same as the first object by virtue of the relationship of the first feature vector and the second feature vector to the first vector cluster.

2. The method of claim 1, further comprising:

upon determining that the second object is same as the first object, providing information to a user indicating detection of the second object within the second image.

3. The method of claim 2, wherein the information is provided to the user in response to receiving a request from a user, the request including instructions indicating that the first object is a target object to be tracked.

4. The method of claim 1, wherein the first sensor and the second sensor are of different sensor types.

5. The method of claim 1, wherein determining that the second object is same as the first object comprises:

calculating one or more distance values corresponding to respective distances between elements of the first feature vector and corresponding elements of the second feature vector; and based at least on the one or more distance values, determining that the second object is same as the first object.

6. The method of claim 5, wherein determining that the second object is same as the first object based at least on the one or more distance values comprises:

determining that the one or more distance values satisfy one or more thresholds; and in response to determining that the one or more distance values satisfy the one or more thresholds, determining the second object is same as the first object.

7. The method of claim 1, wherein detecting the first object within the first image comprises:

providing the first image to a trained neural network, wherein the trained neural network is configured to detect objects of a type as the first object in images.

8. The method of claim 7, wherein an output of the trained neural network comprises:

a portion of the first image corresponding to a bounding box around the first object, the bounding box including the first object.

9. The method of claim 8, wherein extracting the discriminative features of the first object into the first feature vector comprises:

providing the portion of the first image corresponding to the bounding box around the first object to a second neural network, wherein the second neural network is configured to extract discriminative features into an n-dimensional vector based on a received image portion; and obtaining an output of the second neural network, wherein the output of the second neural network includes the first feature vector.

10. The method of claim 9, wherein the second neural network is configured to extract discriminative features based on the received image portion at one of more levels of granularity.

11. The method of claim 10, wherein the one or more levels of granularity include a first level corresponding to a first section of the received image portion, and a second level corresponding to a second section of the received image portion, the second section being different than the first section.

12. The method of claim 11, wherein the first section corresponds to an entirety of the first object, and the second section corresponds to a localized portion of the first object.

13. The method of claim 1, wherein the first object is one of a human or a vehicle.

14. A non-transitory computer-readable medium storing one or more instructions that, when executed by one or more processors, are configured to cause the one or more processors to perform operations comprising:

obtaining a first image from a first sensor;

detecting a first object within the first image;

extracting discriminative features of the first object into a first feature vector;

comparing the first feature vector to each vector cluster of a plurality of vector clusters composing a feature vector database, each vector cluster of the plurality of vector clusters having a unique identifier;

associating the first feature vector with a first unique identifier of a first vector cluster when a comparison threshold is met as a result of the comparing the first feature vector to the first vector cluster of the plurality of vector clusters;

obtaining a second image from a second sensor;

detecting a second object within the second image;

extracting discriminative features of the second object into a second feature vector;

comparing the second feature vector to each vector cluster of the plurality of vector clusters composing the feature vector database;

associating the second feature vector with the first unique identifier when the comparison threshold is met as a result of the comparing the second feature vector to the first vector cluster of the plurality of vector clusters; and determining, based on the association of the second feature vector with the first unique identifier, that the second object is same as the first object by virtue of the relationship of the first feature vector and the second feature vector to the first vector cluster.

15. The non-transitory computer-readable medium of claim 14, further comprising:

upon determining that the second object is same as the first object, providing information to a user indicating detection of the second object within the second image.

16. The non-transitory computer-readable medium of claim 15, wherein the information is provided to the user in response to receiving a request from a user, the request including instructions indicating that the first object is a target object to be tracked.

17. The non-transitory computer-readable medium of claim 14, wherein determining that the second object is same as the first object comprises:

calculating one or more distance values corresponding to respective distances between elements of the first feature vector and corresponding elements of the second feature vector; and based at least on the one or more distance values, determining that the second object is same as the first object.

18. The non-transitory computer-readable medium of claim 17, wherein determining that the second object is same as the first object based at least on the one or more distance values comprises:
  determining that the one or more distance values satisfy one or more thresholds; and
  in response to determining that the one or more distance values satisfy the one or more thresholds, determining the second object is same as the first object.

19. A system comprising:
  one or more processors; and
  one or more computer-readable media storing instructions that, when executed by one or more processors, are configured to cause the one or more processors to perform operations comprising:
    obtaining a first image from a first sensor;
    detecting a first object within the first image;
    extracting discriminative features of the first object into a first feature vector;
    comparing the first feature vector to each vector cluster of a plurality of vector clusters composing a feature vector database, each vector cluster of the plurality of vector clusters having a unique identifier;
    associating the first feature vector with a first unique identifier of a first vector cluster when a comparison threshold is met as a result of the comparing the first feature vector to the first vector cluster of the plurality of vector clusters;
    obtaining a second image from a second sensor;
    detecting a second object within the second image;
    extracting discriminative features of the second object into a second feature vector;
    comparing the second feature vector to each vector cluster of the plurality of vector clusters composing the feature vector database;
    associating the second feature vector with the first unique identifier when the comparison threshold is met as a result of the comparing the second feature vector to the first vector cluster of the plurality of vector clusters; and
    determining, based on the association of the second feature vector with the first unique identifier, that the second object is same as the first object by virtue of the relationship of the first feature vector and the second feature vector to the first vector cluster.

* * * * *